United States Patent

Freedman et al.

[11] Patent Number: 6,165,576
[45] Date of Patent: Dec. 26, 2000

[54] PEELABLE LABEL

[75] Inventors: Melvin S. Freedman, Beachwood, Ohio; Tim Parker, Shrewsbury, Mass.

[73] Assignee: Avery Dennison Corporation, Pasadena, Calif.

[21] Appl. No.: 08/439,414

[22] Filed: May 11, 1995

Related U.S. Application Data

[62] Division of application No. 07/839,369, Feb. 21, 1992.

[51] Int. Cl.[7] .................................................. B29D 23/00
[52] U.S. Cl. .................... 428/36.91; 428/35.7; 428/36.9; 428/36.92; 215/1 C
[58] Field of Search ................................ 428/35.7, 36.9, 428/36.91, 36.92, 903.3; 215/1 C

[56] References Cited

U.S. PATENT DOCUMENTS

| | | | |
|---|---|---|---|
| 2,862,832 | 12/1958 | Shepherd, Jr. | 117/3.2 |
| 2,990,311 | 6/1961 | Shepherd, Jr. | 154/95 |
| 3,043,732 | 7/1962 | Shepherd, Jr. | 156/230 |
| 3,108,850 | 10/1963 | Brandt | 18/55 |
| 3,207,822 | 9/1965 | Makowski | 264/94 |
| 3,484,976 | 12/1969 | Shea | 40/310 |
| 3,503,826 | 3/1970 | Nasica | 156/245 |
| 3,616,015 | 10/1971 | Kingston | 156/230 |
| 3,733,002 | 5/1973 | Fujio | 215/12 R |
| 3,940,001 | 2/1976 | Haefner et al. | 215/1 C |
| 4,359,314 | 11/1982 | Hellmer | 425/503 |
| 4,406,411 | 9/1983 | Gall et al. | 428/577 |
| 4,528,055 | 7/1985 | Hattemer | 156/247 |
| 4,567,681 | 2/1986 | Fumei | 40/310 |
| 4,601,926 | 7/1986 | Jabarin et al. | 428/35 |
| 4,729,864 | 3/1988 | Chang et al. | 264/509 |
| 4,837,088 | 6/1989 | Freedman | 156/243 |
| 4,863,772 | 9/1989 | Cross | 428/40 |
| 4,872,707 | 10/1989 | deBruin | 283/102 |
| 4,883,697 | 11/1989 | Dombusch et al. | 428/35.7 |
| 4,904,324 | 2/1990 | Heider | 156/214 |
| 4,925,714 | 5/1990 | Freedman | 428/40 |
| 4,935,300 | 6/1990 | Parker et al. | 428/352 |
| 4,946,532 | 8/1990 | Freeman | 156/243 |
| 5,019,436 | 5/1991 | Schramer et al. | 428/40 |
| 5,032,344 | 7/1991 | Kaminski | 264/509 |

FOREIGN PATENT DOCUMENTS 2044079  7/1991  Canada .

*Primary Examiner*—S. Mark Clardy
*Assistant Examiner*—Michael A. Williamson
*Attorney, Agent, or Firm*—Renner, Otto, Boiselle & Sklar

[57] ABSTRACT

In-mold plastic labels are provided with separation interfaces whereby the printed surfaces of the labels and the contaminating printing inks associated with them can be removed so as to allow recycling of the bottle stock without contamination by the printing inks.

8 Claims, 2 Drawing Sheets

PEELABLE LABEL

This is a division, of application Ser. No. 07/839,369, filed Feb. 21, 1992.

FIELD OF THE INVENTION

This invention relates to in-mold labelling, using die-cut in-mold labels of the kind adapted to label blow-molded plastic bottles or other containers. Labelling methods and articles of this kind are referred to as "in-mold" because the labels are held in place within the mold wherein the container is shaped during the container-forming step.

The invention particularly applies to in-mold labelling using polymeric labels, rather than using natural cellulose paper labels. Polymeric labels offer many aesthetic and functional advantages over paper labels in the labelling of containers or other articles made by blow-molding plastic resins, such as high density polyethylene (HDPE). When a plastic container such as a HDPE squeeze bottle is used to package a product such as a hair shampoo, a package using a polymeric label is generally more appealing to consumers than a package using a paper label that won't last in the shower and that does not have as attractive an appearance. In many applications, the use of polymeric labels is required for reasons of appearance, handling, performance, moisture-resistance, conformability, durability and compatibility with the container to be labelled. For example, a low-modulus plastic label is generally required for a squeeze bottle so that the label can flex with the bottle without wrinkling or tearing. Polymeric labels also make possible the manufacture of clear or substantially transparent labels having a "no-label look" with only the indicia on the label being readily visible to the consumer.

DESCRIPTION OF RELATED ART

It is recognized that natural paper labels are incompatible in the recycling of molded plastic items. In many applications, in-mold labelling of natural or light colored plastic containers using polymeric labels also presents a recycling problem, both in respect to immediate use of scrap bottles created during production (particularly during start-up) and in respect to post consumer recycling. During production, labels may be applied out of register with the bottles being formed, particularly during start-up of the production line when ideal bottle-forming temperatures and other conditions may not yet be established and stabilized. The scrap bottles caused by process control drift or "start-up bottles" thereby formed cannot be immediately recycled by grinding or shredding them and re-including them in the resin supply for the blow-molding operation. To do so would contaminate the melt with the printing inks with which the polymeric labels are decorated. Instead, the mislabelled bottles or scrap bottles must be discarded, which wastes resin and is a burden on landfill, or the labels with their contaminating inks must be removed from the start-up bottles before the bottles are reground for recycling of the resin. Removal of the contaminating inks often requires cutting out the entire labelled portion of each bottle, since it is usually insufficient to attempt to merely scrape and peel away the label or the face of the label to a sufficient degree to remove the contaminating ink. In any case, such services are labor-intensive and may require contracting out to employers of low-cost labor, with attendant costs of handling, transport, and storage under very low density packing.

In respect to recycling following consumer use and return of bottles, a similar problem is presented. Consumers, or recycling facilities, have no ready way to remove the contaminating inks, short of the inconvenient and labor-intensive steps previously mentioned. Recycling with printed plastic labels intact is restricted to dark colors or multilayer containers with the regrind buried in a central layer. This results in a thick container wall. Recycling of clear or thin-walled light color containers is thereby inhibited, and consumers sensitive to recycling capability are discouraged from using products sold in the bottles.

SUMMARY OF THE INVENTION

The present invention overcomes these problems. In-mold labelling is carried out in such a way as to provide a controlled separation interface within each label between plies that make up the label. This separation interface allows the printed face of the label to be readily separated from the remainder of the label and from the molded bottle. When scrap bottles are formed during start-up (the "start-up bottles" previously referred to), or if an occasional scrap bottle is formed later in production, the printed faces of the labels can be immediately stripped and the scrap bottles immediately fed into a hopper for grinding and re-inclusion in the resin supply without causing color contamination. Consumers can also readily remove the printed faces of the labels before returning the bottles, or they can be readily removed at recycling facilities.

A concept of the present invention is the provision of in-mold label stock of layered film material containing a separation interface. The film material comprises two polymeric film plies each comprising one or more film layers. The two film plies are in contact with each other and present to each other surfaces of different composition at a pair of contacting interior faces joined at the separation interface. One of the film plies comprises printable in-mold label facestock. The other film ply comprises a label core and an adhesive, preferably a heat-activatable adhesive. The film plies have controlled affinity for each other at the separation interface and adhere to each other to a sufficiently high degree to withstand the maximum separation force imposed on the stock at the separation interface as labels are printed, cut from the stock, and deployed for affixation on blown parisons in a blowing mold or on other substrates. However, the film plies adhere to each other to a sufficiently low degree to allow them to cleanly and readily separate from each other at the separation interface under the imposition of stripping or separation forces greater than the maximum separation forces to which they have been subjected during printing, die-cutting and deployment, although the latter forces have been generally regarded by the art as severe, see for example the discussion of stresses on in-mold label stock material in U.S. Pat. No. 4,883,697 to Dornbusch et al. In other words, the separation forces imposed by stripping are greater than the maximum separation forces imposed by printing, die-cutting and deployment, and the differences between the two levels of separation forces can be sufficient to provide reliable printing, die-cutting, positioning and affixing of labels on the one hand, and reliable stripping of the outermost film ply of the label on the other.

BRIEF DESCRIPTION OF THE DRAWINGS

The invention will be more fully understood from the following more detailed description and the accompanying drawings, which are highly schematic or diagrammatic and in which.

DESCRIPTION OF THE PREFERRED EMBODIMENTS

Figure 1:
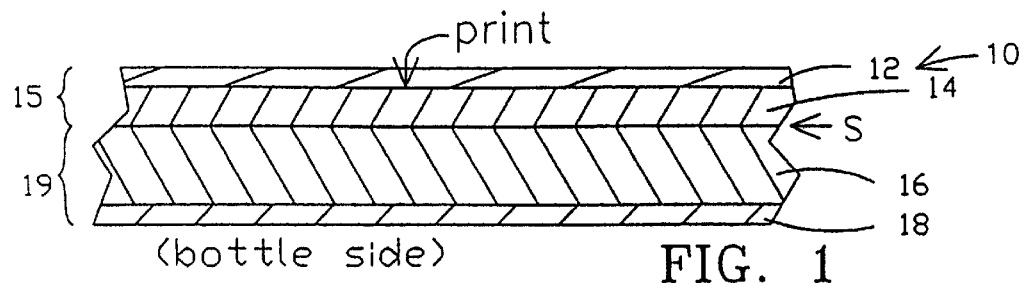
FIG. 1 illustrates a coextruded in-mold label film contemplated by the invention.

The composite or layered label film material 10 shown in FIG. 1 is a coextrusion including the layers 12, 14, 16 and 18. Layer 12 is a printable facestock layer and layer 14 is one of the layers defining a separation interface S, to be described below. The layers 12 and 14 together comprise a multilayer first or peelable film face ply 15. The layer 16 is a core or stiffening layer which contributes to the stiffness of labels cut from the composite label film. Adequate stiffness is necessary to proper printing, sheeting, die-cutting, and undistorted deployment (transfer and insertion) of the label into the mold, as more fully discussed in pending application of common assignee U.S. Ser. No. 07/756,556, filed Sep. 9, 1991, now U.S. Pat. No. 5,242,650 the disclosure of which is incorporated by reference as if fully repeated herein. The layer 18 comprises a heat-activatable adhesive. The layers 16 and 18 together make up a multilayer second or non-peelable film ply 19. The plies 15 and 19 may also be referred to respectively as face ply and core ply. The coextruded label stock is preferably extruded, hot-stretched and annealed in the manner described in said U.S. Pat. No. 5,242,650, subject however to the significant difference that a distinct controlled separation interface is formed between coextruded plies. That is, the coextrusion is carried out with such materials and in such a manner as to define the separation interface S between layers 14 and 16. This separation interface is similar in character to the "peelable interface 17" of Freedman U.S. Pat. No. 4,925,714 to common assignee, the disclosure of which is incorporated by reference as if fully repeated herein. The intimately contacting layers 14 and 16 are of different composition, and the contacting surfaces of layers 14 and 16, that is to say, the pair of contacting interior faces of the first and second film plies 15 and 19, present to each other surfaces of different composition with a controlled degree of incompatibility at a pair of contacting interior faces joined at the separation interface S.

Consistently with the teaching of the foregoing U.S. Pat. No. 5,242,650, a preferable total thickness of the hot coextrudate is about 20 mils, making a total thickness of about 4 mils following hot stretching at a five to one stretch ratio. Obviously, the thicknesses of the hot coextrudate, the degree of stretch, and the thicknesses in the stretched film may all be varied. In a presently preferred construction, the approximate thicknesses of layers 12, 14, 16 and 18 following stretching are respectively 0.5, 1, 2, and 0.5 mils, while the compositions of the layers by weight percentages are:

| Layer 12 | polypropylene homopolymer | 50 |
|---|---|---|
|  | ethylene-vinyl acetate copolymer | 50 |
| Layer 14 | polypropylene homopolymer | 100 |
| Layer 16 | polyethylene blend (see below) | 100 |
| Layer 18 | heat-activatable adhesive | 25 |
|  | polypropylene homopolymer | 25 |
|  | ethylene-vinyl acetate copolymer | 45 |
|  | antistat | 5 |

The polyethylene blend referred to in the foregoing composition is a blend of low and higher density polyethylenes, the exact proportion of which depends on the best trade-off between factors such as flexibility, release, layer thicknesses and production speed for a particular application. Generally, a higher proportion of low density polyethylene favors easier release at the separation interface, and a higher proportion of higher density polyethylenes favors stiffness and enables thinner stock to be successfully die-cut and deployed and/or production speeds to increase. Preferred proportions of polyethylenes of different densities have not been determined as of the date of this application. However, as reflected in the formulation above, indications are that low density polyethylene is to be included and that higher density polyethylene (medium and/or high density) is to be blended therewith. The preferred proportion or proportions will be determined by routine testing. Nucleation by addition of fine particulate to the layer 16 may be used to enhance the degree of polymer crystallinity and increase the stiffness of the layer. In this manner, overall label thickness may be reduced and/or a label may be provided having first and second film plies of similar thicknesses, or even a relatively thinner ply 19, with the ply 19 being relatively stiffer.

The heat-activatable adhesive is a proprietary product sold by H. B. Fuller of Blue Ash, Ohio under product number HM727, and comprises a blend of ethylene-vinyl acetate copolymer ("EVA"), polyethylene waxes and a tackifier effective to accomplish adhesion to HDPE. The adhesive by itself would be far too "watery" or low in viscosity to be successfully extruded, but it melt blends well with the EVA. The EVA stiffens up the extrudate, but is too sticky to process following extrusion, because it tends to stick to processing rolls with which it comes into contact while it is warm so as to damage the adhesive layer or laminate. The addition of polypropylene provides a skeletal backbone structure to give the extrudate excellent heat stability for hot-stretching and other processing.

The antistat is incorporated in the adhesive-containing charge (the charge for layer 18) and uniformly blended therewith. The amount of antistat used may be varied for particular formulations and processing conditions, the 5% amount used herein being typical. The antistat is efficiently used, since it may be added to the adhesive charge only. Thus, addition of antistat only to the adhesive-containing charge provides specificity and efficiency of use without the disadvantages of a topically applied antistat. In certain applications, it may be advantageous to also include the antistat in the central layer charge as well as the base layer charge, or in the central layer charge only.

In the particular adhesive layer composition described, the antistat used is sold by Hoechst Celanese under product number E1956 and is of the type that when added in bulk blooms to the surface and dissipates electrostatic charges by hydrophilic action which attracts extremely minute amounts of ambient moisture. Collection of moisture at the face layer, which may interfere with the label printing process, is avoided by adding the antistat to the adhesive layer only. Moisture collected at the adhesive layer surface does not interfere with adhesion of the label to the container in the in-mold labelling process. It is believed that the moisture is vaporized or dissipated by the elevated molding service temperatures, but in such small quantities as to not interfere with adhesion.

Figure 1A:
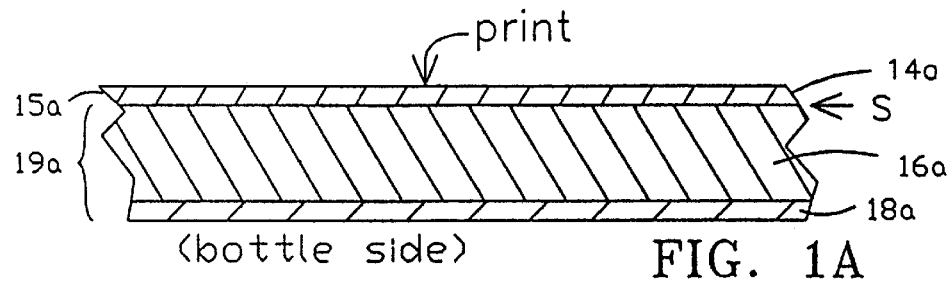
FIG. 1A illustrates another in-mold label film contemplated by the invention.

In the above-described construction, the layer 12 functions essentially to render the label stock printable. In some instances, an acceptable alternative may be to omit the layer 12, as in the construction of FIG. 1A. In this construction, the layer 14a is directly exposed as the print-receiving surface which is rendered printable by corona treatment or the like in a known manner prior to the actual printing step. In such a construction, the first or peelable film ply may be the monolayer face ply 15a consisting of the single layer 14a, and the composition of the layers 14a, 16a and 18a may be as described above for the layers 14, 16 and 18, but thicknesses may be 0.5, 2.5, and 0.5 for layers 14a, 16a and 18a respectively. The layers 16a and 18a together make up the multilayer second or non-peelable film ply 19a.

As described above, the presently preferred compositions of the layers of the face and core plies which define the separation interface comprise different polyolefins in amounts sufficient to yield the desired separation characteristics, the most preferred polyolefins presently being polyethylene and polypropylene homopolymers. These may be reversed from the order described above, for example with layer 14 comprising a polyethylene blend and layer 16 polypropylene homopolymer, but this is less preferable when labelling polyethylene bottles. It is notable that even with such reversal, suitable performance of the overall label construction, and particularly suitable compatibility with the ink-receptive layer and the adhesive layer, is achieved. The presently preferred composition of the printable facestock layer and the adhesive layer comprise blends of olefin polymers and copolymers of olefin monomers with ethylenically unsaturated carboxylic acid or ethylenically unsaturated carboxylic acid ester comonomers such as the ethylene-vinyl acetate copolymer. Thus, the multilayer face and core plies each include a layer of olefin polymers and a layer comprising a blend of olefin polymers and copolymers of olefin monomers with ethylenically unsaturated carboxylic acid or ethylenically unsaturated carboxylic acid ester comonomers such as the ethylene-vinyl acetate copolymer.

Figure 2:
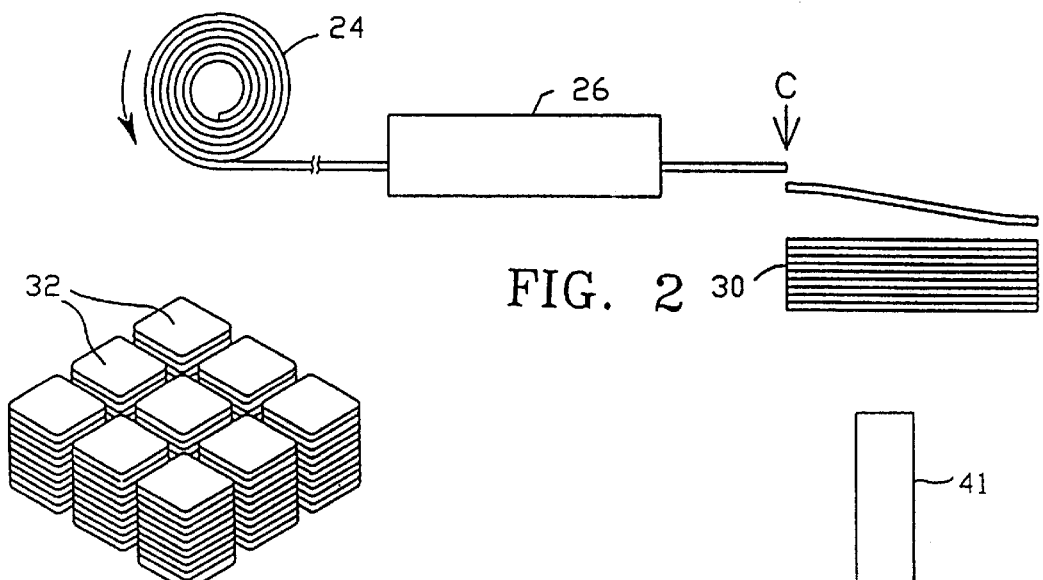
FIG. 2 is a representation of a printing, drying, sheeting and stacking line used in the method of the invention.

As schematically illustrated in FIG. 2, the coextruded, hot-stretched stock, which may be supplied in the form of the self-wound roll 24, may be printed or decorated in a printing press 26, and dried by heat, UV radiation, or the like. The printing or decoration may be covered with a protective lacquer if desired.

Following printing and drying, the stock may be sheeted and stacked in a manner similar to that known for the sheeting of paper-backed label stock. The cutting station is indicated by arrow C in FIG. 2. The severed rectangular sheets are collected to form the stack 30. The stack may contain 100, 200 or more sheets. For clarity of illustration, in the drawing the thickness of the sheets is greatly exaggerated and the stack 30 is therefore shown as being made up of only a relatively small number of sheets. Each sheet in the stack is intended to provide material for several individual labels to be die-cut from the sheeted material.

Figure 3:
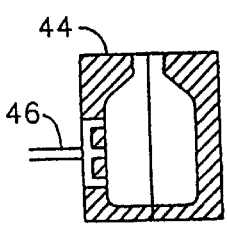
FIG. 3 is an isometric sketch illustrating stacks of individual labels die-cut from the stack of label stock seen in FIG. 2.

Individual labels are formed in a known manner by hollow punches or cutting dies (not shown) which punch out stacks 32 of individual labels from the stack 30 of label stock. For example, the array of nine stacks 32 of individual labels seen in FIG. 3 may be simultaneously punched out of the rectangular stack 30. Alternatively, the labels may be die cut by rotary or reciprocating means from a web without sheeting and then gathered into stacks. In either case, a matrix (not shown) of waste material is left behind. The stacks 32 of individual labels are stabilized by suitable wrapping or packaging (not shown) in a manner similar to that previously used with paper-backed labels. The stabilized stacks 32 are then moved or transported to the site where the blow-molded bottles are being manufactured, which often is a different place than the site of label manufacture.

Figures 4, 5:
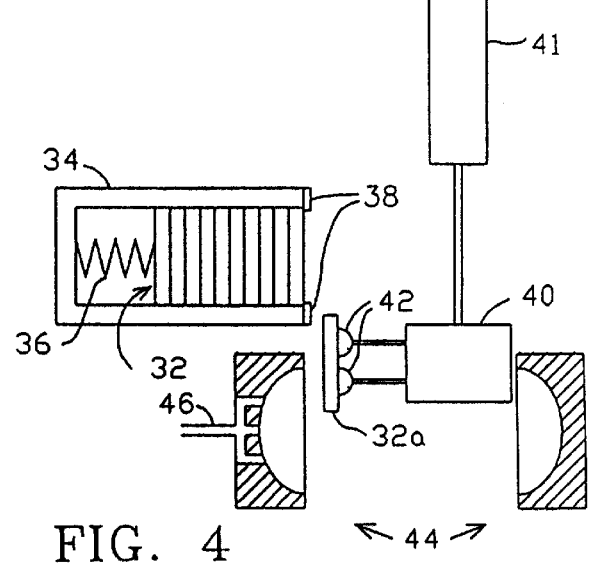
FIG. 4 illustrates the use of the stacked individual labels in a molding operation, including a top view in schematic cross-section of the mold in open position during insertion of a label.
FIG. 5 is a side view in schematic cross-section of the same mold in closed position, but shown empty for simplicity of illustration.

At the site of bottle manufacture, stacks 32 of individual labels are loaded in a dispensing magazine of a known type, schematically illustrated by magazine 34 in FIG. 4. For example, the labels may be advanced to the front of the magazine by spring means 36, and may be lightly retained for pick-off by springy or mechanically retracting retainer fingers or detents 38. A robotic label feed head 40 carries vacuum cups 42 adapted to be advanced by means (not shown) internal to the head 40 to pick off the front label presented by the magazine 34, retracted for translating movement of the head and the single picked-off label 32a into the opened blow mold 44 by actuation of the translating cylinder 41, and advanced again to apply the picked-off label 32a to the proper location on the interior surface of the mold and release it. The label may then be held accurately in position within the mold by vacuum applied to the mold wall through manifolded vacuum line 46 while the label feed head 40 is retracted. The vacuum line outlets to the interior of the mold may be flush with the interior surface of the mold, as shown, so that the label occupies part of the mold cavity proper. In other words, preferably there is no recess on the interior surface of the mold to accommodate the thickness of the label, or any portion of the label thickness.

A hot workpiece or parison (not shown in FIGS. 4 or 5) of HDPE or similar thermoplastic resin, the material for which has been supplied in known manner from a reservoir (not shown) of molten resin, is fed into the mold, the mold is closed, and the parison is expanded in a known manner to complete the formation of the molded container. As the hot parison contacts the adhesive-containing layer 18 of the label, activation of the adhesive is triggered. If as described above the entire thickness of the label is on, not in, the interior surface of the mold, the label becomes embedded in the workpiece to which it is adhered, thus providing a fully inset label that is flush with the container surface and that replaces and therefore saves a portion of the charge for the bottle without diminishing the structural integrity of the bottle to any detected significant degree.

Figure 6:
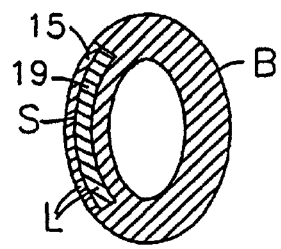
FIG. 6 is a top view in schematic cross-section of an in-mold labelled bottle formed by the mold 44.

FIG. 6 illustrates a cross-section of a formed bottle B which has been in-mold labelled as just described. A label L has been inlaid in the wall of the bottle. The label has first and second film plies 15 and 19 which are firmly joined at the separation interface S. The interply adhesion between first and second film plies 15 and 19 is sufficiently high to withstand the maximum process separation force imposed on the stock at the separation interface S during sheeting, die-cutting, feeding and in-mold application of the labels to bottles as the latter are formed. However, these film plies adhere to each other to a sufficiently low degree to allow them to cleanly and readily separate from each other at the interface S under the imposition of a separation force greater than the aforesaid maximum process separation force encountered in label processing.

As pointed out in previously cited U.S. Pat. No. 4,925,714, the interface peel strength at an interface such as the separation interface S is a function of several parameters, including among others, the identities of the two dissimilar polymeric layers, the presence and types of additives in one or both of the coextruded layers defining the interface, the presence or absence of pigments in one or both layers, the pressure exerted by, and the temperature of, the nip rollers, and thermal aging of the layers. While several factors can play a role in providing a desired peel strength, that desired peel strength can be achieved through routine trial and error adjustments. Strengths which presently are believed most desireable are specified below.

Figure 7:
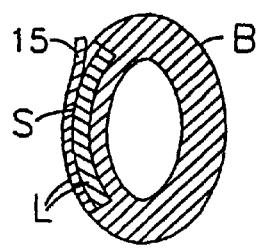
FIG. 7 is a view similar to FIG. 6 showing the face of the label beginning to be peeled from the remainder of the label in a manner contemplated by the invention.

Separation can be achieved by unitary peeling on the one hand, or by grinding, shredding or chopping. In both cases the object is to separate contaminated resin from other resins, not to separate different resin materials. By unitary peeling is meant the kind of peeling that may be accomplished manually by literally peeling back the peelable film ply 15, as seen in FIG. 7. Even though the label is inset into the bottle, the peeling action can be started by prying the edge of the label or pushing a blunt knife or similar tool in the inboard direction over the label edge with a smearing action while bearing down on the label. After the peeling is started, the ply 15 is grasped and manually pulled. The peeling action proceeds continuously and progressively over the interface between the peelable film ply or face ply 15 and the remaining non-peelable film ply or core ply 19. The multilayer film plies 15 and 19 on each side of the interface remain integral films during the peeling.

Separation of peelable face plies from bottles in this manner fully accomplishes the desired separation of printing inks from the bulk of the bottle stock for recycling purposes, leaving the bottle stock uncontaminated by the inks. Separation by unitary peeling will generally be relied on when consumers are expected to do the peeling when returning or delivering used containers for recycling. This process may be automated in commercial or industrial recycling operations by suitable means such as mechanically replicating the manual removal described above, or using powered axially-rotating cylindrical arrays of stiffly flexing rubber pusher fingers or the like (not shown) which are brought to bear on the label surface in an action similar to that of well-known "chicken picker" apparatus for defeathering fowl.

Figure 8:
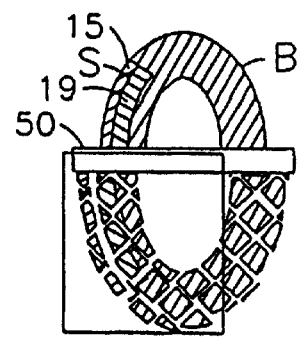
FIG. 8 is a similar view illustrating in an artificially regularized manner another aspect of the invention in which a similar labelled container is ground into particles for classification.
Figure 8A:
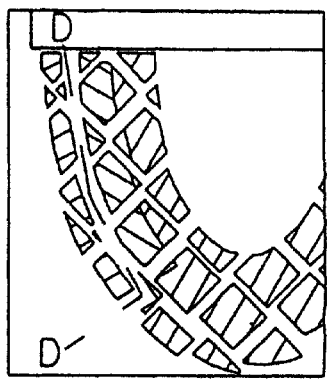
FIG. 8A shows a portion of FIG. 8 on an enlarged scale. The thicknesses of the films, labels and bottles seen in the figures are greatly exaggerated for clarity of illustration.

Separation by grinding, shredding or chopping involves both separation at the peeling interface during grinding itself, and subsequent particle classification. The classification step separates particles resulting from the grinding into two classes: (1) particles containing contaminant (ink) and (2) particles free of contaminant. The object is to isolate contaminated resin from the bulk of the resinous material, not to separate resins of different kinds. A grinding operation is represented for clarity in a highly schematic and artificially regularized fashion in FIGS. 8 and 8A which show a labelled bottle B being passed through a grinder 50. Grinding subjects the film material to high mechanical stresses, so that the separation interface S experiences separation forces sufficient to cause the particles being formed by the grinding to split at this interface. The result is two classes of particles, as seen on opposite sides of the dividing line D—D in FIG. 8A. One class of particles (to the right of dividing line D—D) consists entirely of the bottle material, or consists entirely of the material of core ply 19, or consists partly of both. The other class of particles consists entirely of the material of face ply 15. These classes of particles are then separated using any well-known particle classification technique, such as centrifuging or flotation, which exploits a difference in density or specific gravity between the classes of particles in order to complete separation.

In some circumstances, it may be most efficient or economical to recycle by only partially grinding the bottles in the label area. Thus, the labelled side of the bottle may be engaged with grinding means to the extent necessary to wholly or partially remove the label while leaving the remainder of the bottle whole for remelting. Such removal could be followed by particle classification if the amount of removed material other than from the contaminated face ply made it worthwhile. In some cases, very precise adjustment of grinding conditions may even allow the peelable film ply alone to be removed by shredding or grinding of such ply alone to an extent sufficient to cause separation at the separation interface. There would then be no need or purpose for a subsequent reclassification step. Such a process might be an alternative for unitary peeling by hand or by automated means, and might in some circumstances be more efficient than unitary peeling while, as in unitary peeling, avoiding the need for particle classification.

When grinding is to be used followed by particle classification based on density, materials for the bottle stock and for the non-peelable film ply or core ply on the one hand, and for the peelable film ply or face ply on the other hand, must be sufficiently different to allow successful classification. The specific gravity of polyester bottles in common use is generally relatively high, say about 1.25, and that of vinyl bottles is about 1.3 or 1.4., so generally materials chosen for the peelable film ply or face ply will be lower density materials, such as unfilled polyethylene or polypropylene of say about 0.9 specific gravity. Materials for the non-peelable film ply or core ply may be given higher densities, say up to about 1.2 to 1.4, by use of filler, provided the filler is not such as to unacceptably degrade the material mix that is recycled for container manufacture. In general, use of filler in the non-peelable film ply or core ply may be matched to filler use in the bottle material for desired results. For low density polyethylene and polypropylene containers, the peelable film ply or face ply may employ fillers and pigments to increase density for centrifugal separation after grinding.

In many circumstances, the constraints as to relative specific gravities may be looser than indicated above, due to the fact that the label material in its entirety constitutes only a minor part of the total bottle construction. Therefore, if some of the core ply is separated along with the face ply, the loss to recycling may be minor and acceptable. The major consideration is the accomplishment of complete removal of the material of the face ply, containing the contaminating inks. If that is accomplished, removal of some additional material may be inconsequential. Thus, for example, when subjected to centrifuging or flotation, if the core ply has a specific gravity as low as that of the face ply, ground particles consisting entirely of the core ply will separate along with the face ply, and particles consisting of both the bottle stock and the core ply will also tend to separate along with the face ply. Such tendency will be greatest for those individual particles of the latter type where the material of the relatively light core ply makes up most of the particle. Individual particles where the opposite is true will tend to remain with the bottle stock. This loosening of constraints as to required density relations provides more options than would otherwise be the case as to use or non-use of fillers, or as to the degree of filler use, when matching the core plies to the bottle material as mentioned above.

Whether separation is accomplished by unitary peeling or by grinding, the non-peelable core ply 19 remains with the bottle stock, but is of such a nature that contamination of the bottle stock does not occur, or is minimized to such an extent that the stock is acceptable for remelting and reuse, either in the same application as in its virgin use, or in other applications which are less demanding as to stock specifications. In particular, in many applications, the non-peelable core ply 19 is sufficiently compatible with reuse of the bottle stock that if a defect such as incorrect label orientation occurs during bottle manufacture (particularly a risk during startup), the peelable face ply can be removed by direct peeling, or by regrinding combined with centrifuging or flotation, and the bottle material, including the material of the core ply 19, can be directly cycled back to the bottle-maker's own resin inventory for the blow-molding line, and can be immediately remelted for reuse on the bottle line.

When separation is to be accomplished by unitary peeling, peel strengths in the range of about 30–200 grams per two-inch width at 90 degrees peel have been found effective. Peel strengths in the range of about 50–150 are preferred, and most desireable are interfacial peel strengths in the range of about 55–75. Desired values for peel strengths when separation is to be by grinding followed by centrifuging or flotation have not been confirmed but are believed to approximate those given above for unitary peeling.

In some applications, during bottle manufacture when the face ply of a misaligned label has been peeled off and the bottle proper is not defective, it may be acceptable to reapply a fresh label over the structure that remains after removal of the face ply, even though such new label will not be completely "inlaid" in the labelled face of the bottle. Such a defectively labelled bottle would not be remelted, but could simply receive a new label in an off-line post-molding operation. Application of the new label might be accomplished by known out-of-mold applicator devices such as a hot-stamping machine or a "Therimage" type applicator or "decorator." Subsequently, such a bottle could be recycled like any other, since the peelable film ply of the new label could be removed in the same manner as other labels, whether by unitary peeling or by grinding and subsequent particle classification.

Whenever consistent with the present description of invention, in connection with the various stages of label stock manufacture and labelling referred to herein, it is presently believed generally desireable to also observe the practices and criteria disclosed in foregoing U.S. Pat. No. 5,242,650, the disclosure of which has been incorporated herein by reference.

As used in the foregoing description of the invention and in the following claims, "bottles" refers to all forms of blow-molded containers, and generally to all similar blown products suitable for labelling. The terms "grinding," "shredding," and "chopping" are used interchangeably.

It should be evident that this disclosure is by way of example and that various changes may be made by adding, modifying or eliminating details without departing from the fair scope of the teaching contained in this disclosure. As an example of the many possible variations in the practice of the invention, die-cutting of labels may be done directly by rotary or reciprocating means and such labels may then be gathered into individual stacks of labels, thus substituting a gathering step for the step of forming the stack 30. Alternatively, die cutting of labels may be done in-line with the molding operation or other workpiece forming operation, with the labels then being picked off one by one by the label inserting mechanism. Or, rolls of labels might be delivered into a slot in the mold half and die-cut by the action of the mold closing.

Indeed, while the invention has been described in connection with in-mold labelling and presently appears to be particularly advantageous for that application, the same concepts also have utility for providing graphics or decoration for polymeric substrates thermally formed as by thermoforming, injection molding, reaction injection molding, rotational molding, and forming of sheet molding compound. Die-cut labels of the present invention can also be applied by hot stamping or ironing or roll application, either those provided with continuous carrier or those whose backing is die-cut to the same shape. If pressure-sensitive adhesive is applied or transfer-coated onto the multiply extrudate after printing to form an adhesive layer in place of the layer 18, application can be by pressure alone. Application of labels might be accomplished by known out-of-mold applicator devices such as a hot-stamping machine or a "Therimage" type applicator or "decorator."

The invention therefore should not be limited to particular details of this disclosure except to the extent that the following claims are necessarily so limited.

What is claimed is:

1. An in-mold labelled plastic bottle or other substrate comprising a substrate body, a label formed of a coextruded layered film material and containing within itself a separation interface, said label being applied to the substrate body, said layered film material comprising two polymeric film plies each comprising one or more film layers, said film plies being on contact with each other and presenting to each other surfaces of different composition at a pair of contacting interior faces joined at said separation interface, one of said film plies comprising printable in-mold label facestock, including a printable face layer, the other of said film plies comprising a core or stiffening layer of polymetric film and a heat-activatable adhesive layer, said film plies adhering to each other at said separation interface to a sufficiently high degree to withstand the maximum process separation force imposed at said separation interface as said layered film material is printed and as labels cut therefrom are deployed from affixation on said substrate, said film plies adhering to each other at said separation interface to a sufficiently low degree to allow them to cleanly and readily separate from each other at said separation interface under the imposition of a separation force greater than said maximum process separation force.

2. An in-mold plastic labelled plastic bottle or other substrate as in claim 1, wherein the peel strength at said separation interface is in the range of about 30 to 200 grams per two-inch width at 90 degrees peel.

3. An in-mold plastic labelled plastic bottle or other substrate as in claim 1, wherein the peel strength at said separation interface is in the range of about 50 to 150 grams per two-inch width at 90 degrees peel.

4. An in-mold plastic labelled plastic bottle or other substrate as in claim 1, wherein the peel strength at said separation interface is in the range of about 55 to 75 grams per two-inch width at 90 degrees peel.

5. An in-mold plastic labelled plastic bottle or other substrate as in claim 1, wherein said surfaces of said contacting faces are formed of different polyolefins.

6. An in-mold plastic labelled plastic bottle or other substrate as in claim 5, wherein said surfaces of said contacting faces are formed of either polyethylene homopolymer of polypropylene homopolymer.

7. An in-mold plastic labelled plastic bottle or other substrate as in claim 1, wherein at least one of said film plies includes a plurality of said film layers, said film layers including a layer of olefin polymer and a layer comprising a blend of olefin polymers and copolymers of olefin monomers with ethylenically unsaturated carboxylic acid or ethylenically unsaturated carboxylic acid ester comonomers such as the ethylene-vinyl acetate copolymer.

8. An in-mold plastic labelled bottle or other substrate as in claim 1 wherein the label is formed of a coextruded and hot-stretched layered film material.

* * * * *